(12) United States Patent
Montellanico et al.

(10) Patent No.: US 10,045,660 B2
(45) Date of Patent: Aug. 14, 2018

(54) KIT FOR THE HEAT TREATMENT OF FOODS

(71) Applicants: Stefano Montellanico, Rome (IT); Gabriele Teofilatto, Rome (IT)

(72) Inventors: Stefano Montellanico, Rome (IT); Gabriele Teofilatto, Rome (IT)

(*) Notice: Subject to any disclaimer, the term of this patent is extended or adjusted under 35 U.S.C. 154(b) by 288 days.

(21) Appl. No.: 14/784,125

(22) PCT Filed: Mar. 13, 2014

(86) PCT No.: PCT/IB2014/059725
§ 371 (c)(1),
(2) Date: Oct. 13, 2015

(87) PCT Pub. No.: WO2014/170768
PCT Pub. Date: Oct. 23, 2014

(65) Prior Publication Data
US 2016/0029837 A1     Feb. 4, 2016

(30) Foreign Application Priority Data

Apr. 18, 2013   (IT) .............................. RM2013A0234

(51) Int. Cl.
*A47J 36/28*     (2006.01)
*A45C 11/20*    (2006.01)
*F24J 1/00*       (2006.01)

(52) U.S. Cl.
CPC .............. *A47J 36/28* (2013.01); *A45C 11/20* (2013.01); *F24J 1/00* (2013.01)

(58) Field of Classification Search
CPC . A47J 36/28; A47J 27/00; A47J 27/004; F24J 1/00

(Continued)

(56) References Cited

U.S. PATENT DOCUMENTS 4,061,313 A * 12/1977 Brauner ................ B01F 5/0619
366/340
4,721,624 A    1/1988 Schumann
(Continued)

FOREIGN PATENT DOCUMENTS

EP              0107809 A1    5/1984
WO      WO-2012081655 A1    6/2012

OTHER PUBLICATIONS

International Search Report for PCT/IB2014/059725, ISA/EP, Rijswijk, dated Jun. 25, 2014. (In English).

*Primary Examiner* — Gregory Huson
*Assistant Examiner* — Nikhil Mashruwala
(74) *Attorney, Agent, or Firm* — Harness, Dickey & Pierce, P.L.C.

(57) ABSTRACT

A kit for heat treating foods comprises a first portion including at least one plate, at least one vat, at least one coil-shaped phial, at least one wall, and at least one pin. The at least one plate has a first compartment and a second compartment. The at least one vat is attached to the at least one plate to form an interspace containing $CaCl_2$ scales. The at least one coil-shaped phial is disposed in the interspace and contains deionized water. The at least one wall is arranged transversely to the at least one coil-shaped phial and divides the at least one coil-shaped phial into at least two sectors. The at least one pin extends from a surface of the at least one vat and is arranged adjacently to the at least one coil-shaped phial. The at least one pin is configured to break the at least one coil-shaped phial.

15 Claims, 5 Drawing Sheets

(58) Field of Classification Search
USPC .......... 126/263.09, 263.03, 263.06, 206, 246
See application file for complete search history.

(56) References Cited

U.S. PATENT DOCUMENTS

| | | | | |
|---|---|---|---|---|
| 4,780,117 A * | 10/1988 | Lahey | ..................... | A61F 7/106 |
| | | | | 126/263.07 |
| 5,542,418 A * | 8/1996 | James | ..................... | A47J 36/28 |
| | | | | 126/263.06 |
| 5,984,953 A * | 11/1999 | Sabin | ........................ | A61F 7/03 |
| | | | | 607/108 |
| 6,289,889 B1 * | 9/2001 | Bell | ......................... | A61F 7/03 |
| | | | | 126/263.07 |
| 6,644,383 B2 * | 11/2003 | Joseph | ............... | B65D 81/3484 |
| | | | | 126/263.01 |
| 6,827,080 B2 * | 12/2004 | Fish | ......................... | A61F 7/03 |
| | | | | 126/263.01 |
| 7,021,064 B2 * | 4/2006 | Wohland | ............... | A45D 34/00 |
| | | | | 126/263.07 |
| 8,118,021 B2 * | 2/2012 | Cho | ........................ | A47J 36/28 |
| | | | | 126/263.01 |
| 8,261,735 B2 * | 9/2012 | Jo | .......................... | A47J 36/28 |
| | | | | 126/263.01 |
| 9,078,742 B2 * | 7/2015 | Quincy, III | ................ | A61F 7/03 |
| 9,428,318 B2 * | 8/2016 | Young | ................ | B65D 81/3272 |

\* cited by examiner

KIT FOR THE HEAT TREATMENT OF FOODS

CROSS-REFERENCE TO RELATED APPLICATIONS

This application is a 371 U.S. National Stage of International Application No. PCT/IB2014/059725, filed Mar. 13, 2014, which claims priority to Italian Application No. RM2013A000234, filed Apr. 18, 2013. The entire disclosures of the above applications are incorporated herein by reference.

FIELD OF THE ART

The present invention refers to the field of containers for foods. More in detail, the present invention refers to a particular type of containers which, by exploiting the thermal variations induced by known chemical transformations, allow varying the temperature of the food contained in the container.

STATE OF THE ART

Self-heating plates, adapted to heat foods, have been known for many years. The heating of the plate can be activated in many ways: for example, by pressing a suitable button on the food package, by unwrapping and shaking the pack, or by pouring the contents of one bag into another, with a wait time of several minutes. All of these methods exploit the heat produced by exothermic and spontaneous chemical reactions. For example, it is widely known to exploit the reaction of the calcium oxide with water for producing heat and warming drinks. The exothermic reaction in question is the following:

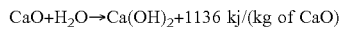

$$CaO + H_2O \rightarrow Ca(OH)_2 + 1136 \text{ kj/(kg of CaO)}$$

The amount of heat produced is in particular used for heating canned drinks. More in detail, the calcium oxide is suitably inserted in an interspace present in the bottom of the can. By exerting pressure on said bottom, in a manner so as to cause the breakage of a membrane, one places the oxide in contact with the water, which results in the food being heated. Also known for heating foods is the exothermic reaction of dissolution of calcium chloride in water:

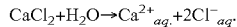

$$CaCl_2 + H_2O \rightarrow Ca^{2+}_{aq.} + 2Cl^{-}_{aq.}$$

In addition to the need to heat foods by exploiting chemical reactions, of course in contexts where it is not possible to make use of conventional heat sources, there is also the widely recognized need to cool certain foods, usually drinks adapted to cool the body; or there is the need to preserve certain foods for longer time periods, slowing the natural degradation process thereof. Of course, also the cooling occurs in those circumstances in which no conventional cooling instruments are available. Thus, for heating, cooling and/or for preserving foods, the chemical-physical properties of various chemical substances can be exploited. One of these, used frequently for such purposes, is carbon dioxide in solid state ($CO_{2(s)}$), commonly known as "dry ice". For years, solid $CO_2$ has in fact been used in catering services; in airport catering; in the frozen food industry, in companies that send fresh product samples, ice cream and frozen food via airplane or overland; and for fresh food products requested on-line. Dry ice is generally provided made of 3 mm diameter pellets or 16 mm diameter cylinders. Its temperature is −78° C., with a cooling power of 150 frigories/Kg, equal to about 170% more than ice (from water). Carbon dioxide in solid state, moreover, neither wets nor creates humidity, since it sublimates the moment it comes in contact with the air (in ordinary conditions). Solid $CO_2$ also shows a bacteriostatic and fungistatic action and is a retardant of fermentation. Nevertheless, it has application limits, due to its short stay-time (at atmospheric pressure and at room temperature) in solid state. Thus, when it is used, it is advisable to employ polystyrene packing or in any case isothermal containers (cryobox) for limiting the dispersion of the dry ice. Thick polystyrene boxes or insulated urethane boxes at least two inches thick are for example ideal. Generally, for an initial amount of solid $CO_2$ comprised between 2.5 Kg and 4.5 kg, about 24 hours are required for ensuring that all the $CO_{2(s)}$ sublimates, of course also depending on the type of container employed. Due to this behavior, $CO_{2(s)}$ is usually used in large quantities and for applications like those listed above. It is instead rarely used for offering "retail" refrigeration since very small amounts of $CO_{2(s)}$, that are however sufficient for substantially cooling a drink, would sublimate in such short time periods to make the utility of their chemical-physical properties practically nonexistent. For these reasons, at present, retail food products cannot be found on the market that are preserved in containers provided with a refrigeration system that uses $CO_2$. Nevertheless the possibility of offering, to the consumer, not just food heating but also a retail refrigeration service that is very effective, like that offered by solid $CO_2$, could be very advantageous in various situations; by way of a non-limiting example, such situations could include during meal service on airplanes, or circumstances in which conventional ice (from water) is not available.

For such purpose, the present industrial invention patent application, which will be described in detail hereinbelow, proposes a new takeaway container type for foods, solids and liquids, characterized in that it comprises components and systems that allow both the heating of a food and its cooling by exploiting chemical transformations. Object of the present invention is also that of offering the consumer the possibility to make use of a container for foods which is easily transportable in an original manner and which is aesthetically pleasing.

DESCRIPTION OF THE INVENTION

The present industrial invention patent application describes a new system for the heat treatment of foods, exploiting the effects of specific and known chemical transformations, in order to be able to vary the temperature of said foods—with respect to the room temperature—raising it and lowering it. More in detail the present invention describes a kit of components that allow a given consumer to enjoy a meal comprising solid foods and liquid drinks, and be able to heat and cool said foods in situations in which it is not possible to make use of conventional sources of food heating and/or cooling, for example during meal service on airplanes or in trains.

Still more in detail, the subject of the present description is a kit which in its base version comprises at least one plate having at least one compartment adapted to contain relevant objects such as toothpicks and/or serviettes, and at least one compartment adapted to contain a given dish that one wishes to heat. In addition, beyond the aforesaid components, said kit comprises, in a particular embodiment, at least one compartment adapted to receive components which allow the cooling of a given food, and preferably of a given drink. The kit substantially comprises two portions: one, adapted for heating the dish/dishes; the other, adapted for cooling the drink(s). The two portions can be integrally joined, for example with ultrasound technique; or they can be separatable, being joined by a common tear-off connection that allows, with a tearing action, the separation of the two portions; or they can be easily assemblable. The portion used for heating the dish/dishes further comprises a vat on the lower part, in which the plate having the compartments is inserted, in a manner such that said plate and said vat form an interspace. The vat, otherwise understood to be a vessel or receptacle, may be of varying size or shape provided it suitably receives a portion of the plate to allow for the aforementioned interspace. The heating plate and the underlying vat are also welded; the welding, also in this case, can occur with an ultrasound technique. The interspace deriving from their junction is adapted to contain specific chemical reagents which, placed in contact, will give rise to exothermic transformation; the heat produced therefrom will raise the temperature of the overlying dish. More in detail, the interior of the interspace comprises a predefined amount of $CaCl_2$ and at least one phial preferably shaped as a coil, containing preferably deionized water. The heating portion is also externally provided with zones that, when pressed, facilitate the breakage of the phial. More in detail the heating portion internally has, on the internal walls thereof and preferably on the internal lateral walls of the vat, at least one pin adapted to break the phial when the user exerts a slight pressure on the external surface portion of the container, which is situated at said pin. The dispersion of the water inside the interspace, in which also the $CaCl_2$ is contained, will raise the temperature and heat the dish. In the many different embodiments of the invention, the profile of the phial containing water is variable. In addition, in particular embodiments it is possible to heat the dish at separate time intervals, inducing a gradual dispersion of water in the interspace. This solution may be particularly useful in the case in which multiple dishes are to be eaten at different times, or if a gradual heating of the meal is requested. In both of the abovementioned cases, the interspace adapted to contain the reagents $CaCl_2$ and water comprises, as component used for containing the water, a coil which is internally divided into sectors. The separate breakage of each sector causes the release of a specific amount of water which, in contact with the calcium chloride, will facilitate the increase of the temperature and the heating of the food. The subsequent breakage of another sector will cause a further heating of the dish, thus allowing the user to heat his meal at different times.

The portion used for cooling the food, and in particular for cooling the drink, is instead represented by at least one compartment adapted to receive a container made of polystyrene used for containing small amounts of solid $CO_2$, inserted in said container during the packaging of the kit or slightly before a given meal service like that served on an airplane flight or train voyage. The container made of polystyrene is characterized in that it has a thickness of at least 1.5 cm in a manner so as to prevent the quick dispersion of the $CO_{2(s)}$ contained therein. For the same purpose, said container is provided with a cover adapted to isolate the $CO_{2(s)}$ from the environment outside the container, and be removed therefrom only when the user of the kit intends to cool his drink. Said cooling will therefore occur by removing the cover, made of polystyrene, from the container, and inserting the glass or small bottle containing the drink inside said container. More in detail, the cooling will occur since the bottom of said glass or small bottle will rest on a certain amount of $CO_{2(s)}$ pellets or cylinders.

BRIEF DESCRIPTION OF THE DRAWINGS

FIG. 2 (c) is a plan view of FIG. 2 (b). The figure in question intends to underline the particular profile of the at least one phial 6 in a particular embodiment of the present invention, in which the at least one phial 6 is shaped as a coil. This embodiment is particularly useful in the case in which it is necessary to heat the meal at different times: as occurs if said meal comprises two different dish types. The coil-shaped at least one phial 6 can for such purpose be divided into at least two sectors 6' due to the presence of at least one internal wall 15, transverse with respect to the at least one phial 6, adapted to facilitate a selective release of the amount of water contained in each sector 6'. Also in this case, the breakage of the at least one phial 6, and more in detail of a specific sector 6' of the at least one phial 6, occurs by suitably acting on the pin 7 corresponding with the section of the at least one phial 6 of interest.

FIG. 3 (b) instead shows a front view of the longitudinal section of the container 9 in open configuration. More in detail, the figure in question shows the case in which, once the cover 11 has been removed, a common glass adapted to contain any drink is inserted inside the cavity 10 at the height of its bottom. The cooling of the drink occurs since said bottom of the glass rests on a plurality of $CO_{2(s)}$ pellets or cylinders.

FIG. 5 (a) is a plan view of the kit 1 in open configuration, and FIG. 5 (b) is a plan view of the kit 1 in closed configuration. The figure in question, and in particular FIG. 5 (a), also intends to underline the presence of an atomizing hole 19 present on the surface of the at least one compartment 12 of the kit 1. More in detail, in the case in which the kit 1 comprises the at least one compartment 12 containing the liquid condiment, said hole 19 allows dispensing the condiment, on the dish, with a spray mechanism, in a manner so as to distribute said condiment in a more uniform manner and preventing the user from coming into direct contact with the condiment (as occurs for conventional systems), running the risk of staining his clothes.

DESCRIPTION OF THE PREFERRED EMBODIMENTS

Figure 1:
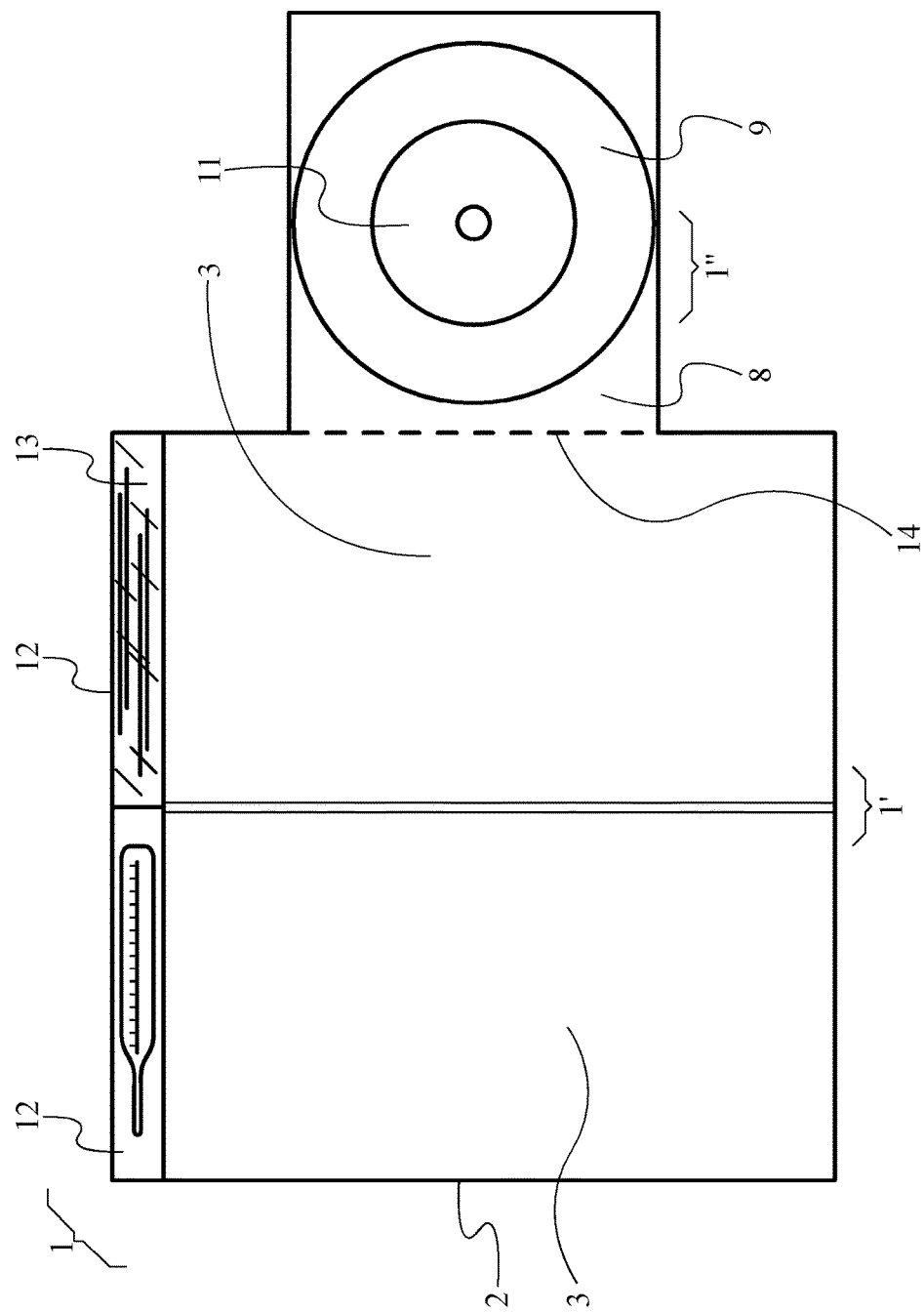
FIG. 1 shows a plan view of the kit 1 for the heat treatment of foods, subject of the present industrial invention patent application. In a particular embodiment thereof, as is observed in the figure, the kit 1 comprises a first portion 1' and a second portion 1". The first portion 1', used for heating one or more dishes, comprises at least one compartment 3 adapted to contain said dishes, and at least one compartment 12 adapted to contain objects such as serviettes and/or a thermometer and/or toothpicks. In addition, the at least one compartment 12 has the bottom covered by mirrored material 13. The second portion 1", used for cooling the food, and in particular for cooling the drink, comprises at least one compartment 8 adapted to receive a container 9 in turn used for containing a specific amount of $CO_{2(s)}$. The container 9 is made of polystyrene and is provided with a cover 11 adapted to isolate the solid $CO_{2(s)}$, inside the container 9, from the outside environment. The first and second portions 1' and 1" are also separable from each other due to a connection 14 having a common tear-off serration.
Figure 2:
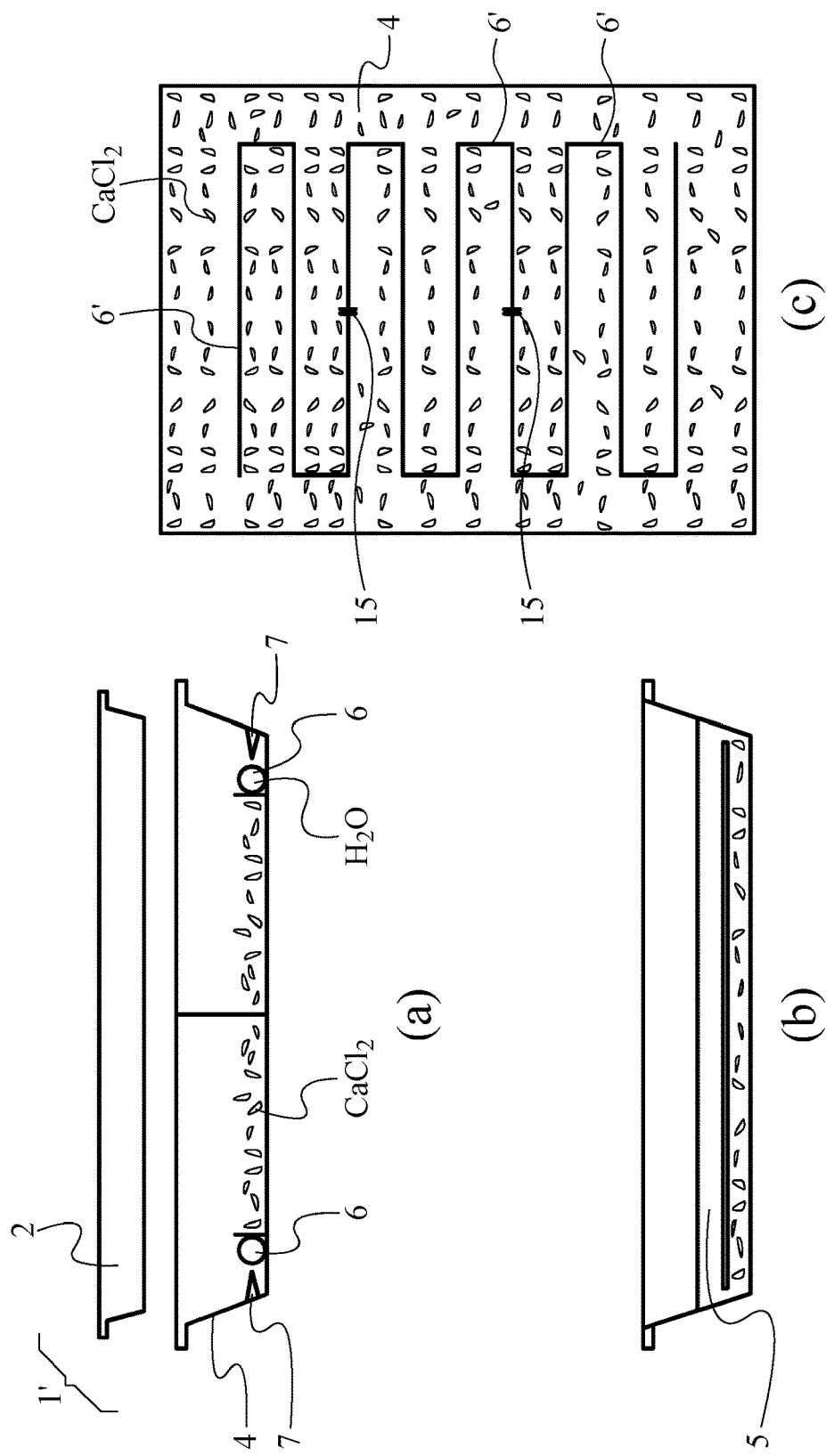
FIG. 2 shows a detailed side view of the first portion 1' of the kit 1 for the heat treatment of foods. More in detail FIG. 2 (a) shows that the first portion 1' comprises at least one plate 2, having the at least one compartment 3 (not shown in the figure); and at least one vat 4 in which the plate 2 is inserted. On the bottom of the at least one vat 4, the chemical substances are inserted; i.e., the water contained in at least one phial 6 and the $CaCl_2$ in scale form which during reaction produce heat and heat the overlying dish/dishes. The exothermic reaction in question occurs inside an interspace 5 (FIG. 2 (b)) which is formed by the assembly of the plate 2 and the vat 4. Said assembly occurs by means of ultrasound welding. The reaction is initiated by breaking the at least one phial 6 by suitable pins 7, present on an inner surface of the at least one vat 4, adjacent the at least one phial 6. The breakage of the at least one phial 6 occurs, more in detail, by exerting light pressure on the external surface of the at least one vat 4 at the pins 7.
Figure 3:
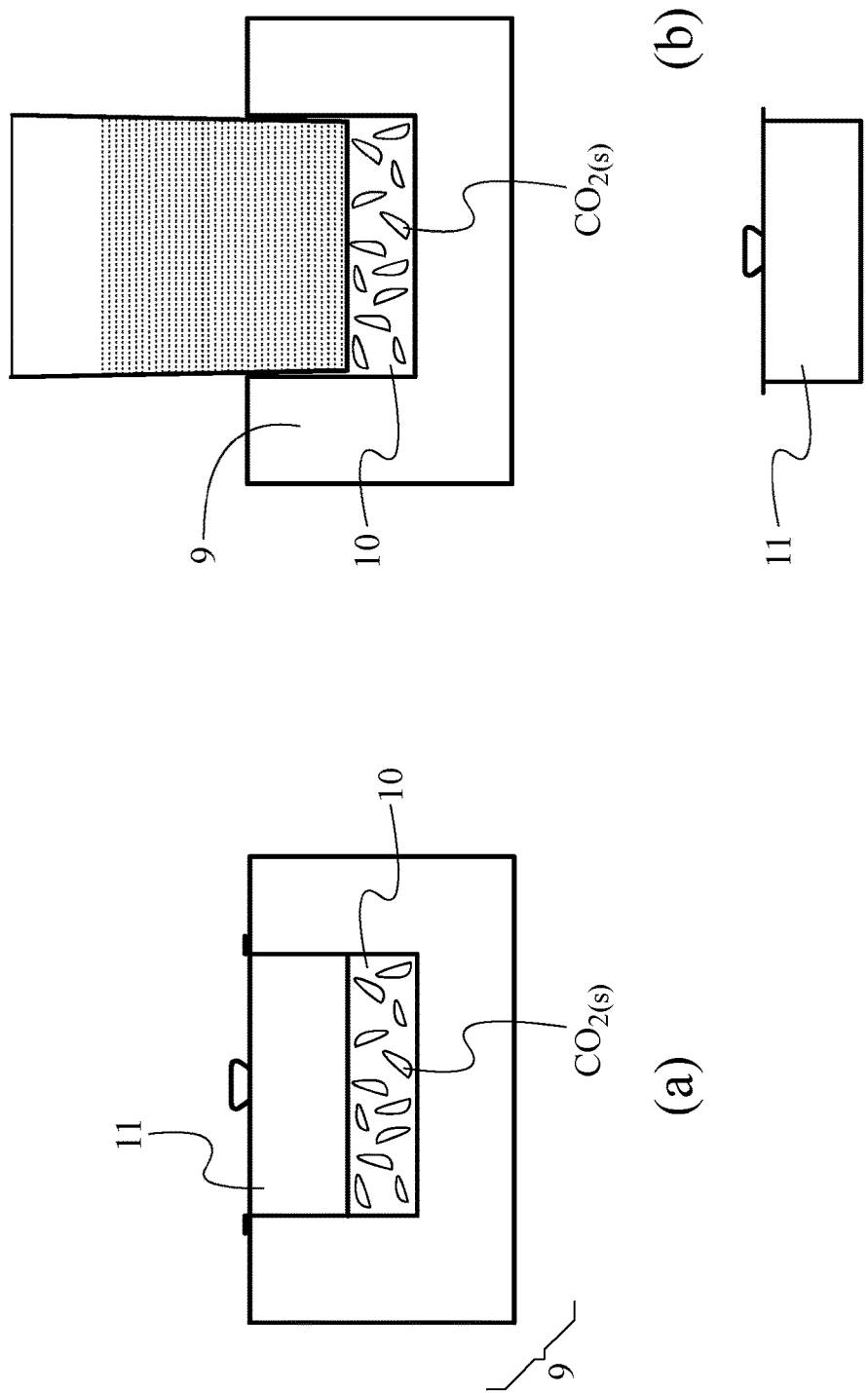
FIG. 3 shows a front view of the container 9 comprised in the kit 1, subject of the present invention. More in detail FIG. 3 (a) shows a front view of the longitudinal section of the container 9 in closed configuration. The figure in question shows the presence of the cover 11 covering an interspace or cavity 10 formed in the container 9. The interspace 10 is adapted to contain a predefined amount of the $CO_{2(s)}$.
Figure 4:
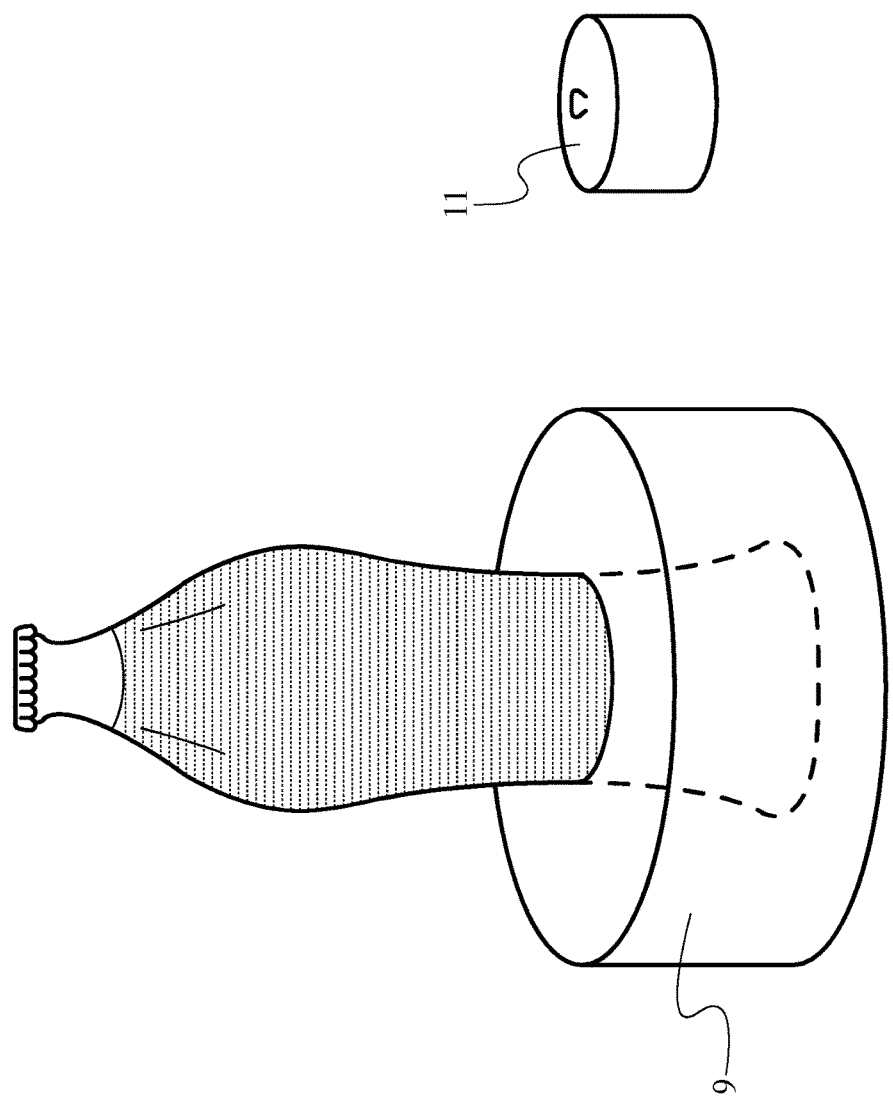
FIG. 4 shows a perspective view of the use of the container 9 comprised in the kit 1, subject of the present invention. In particular the figure in question shows the case in which the container 9 is adapted to contain a common small bottle for drinks.
Figure 5:
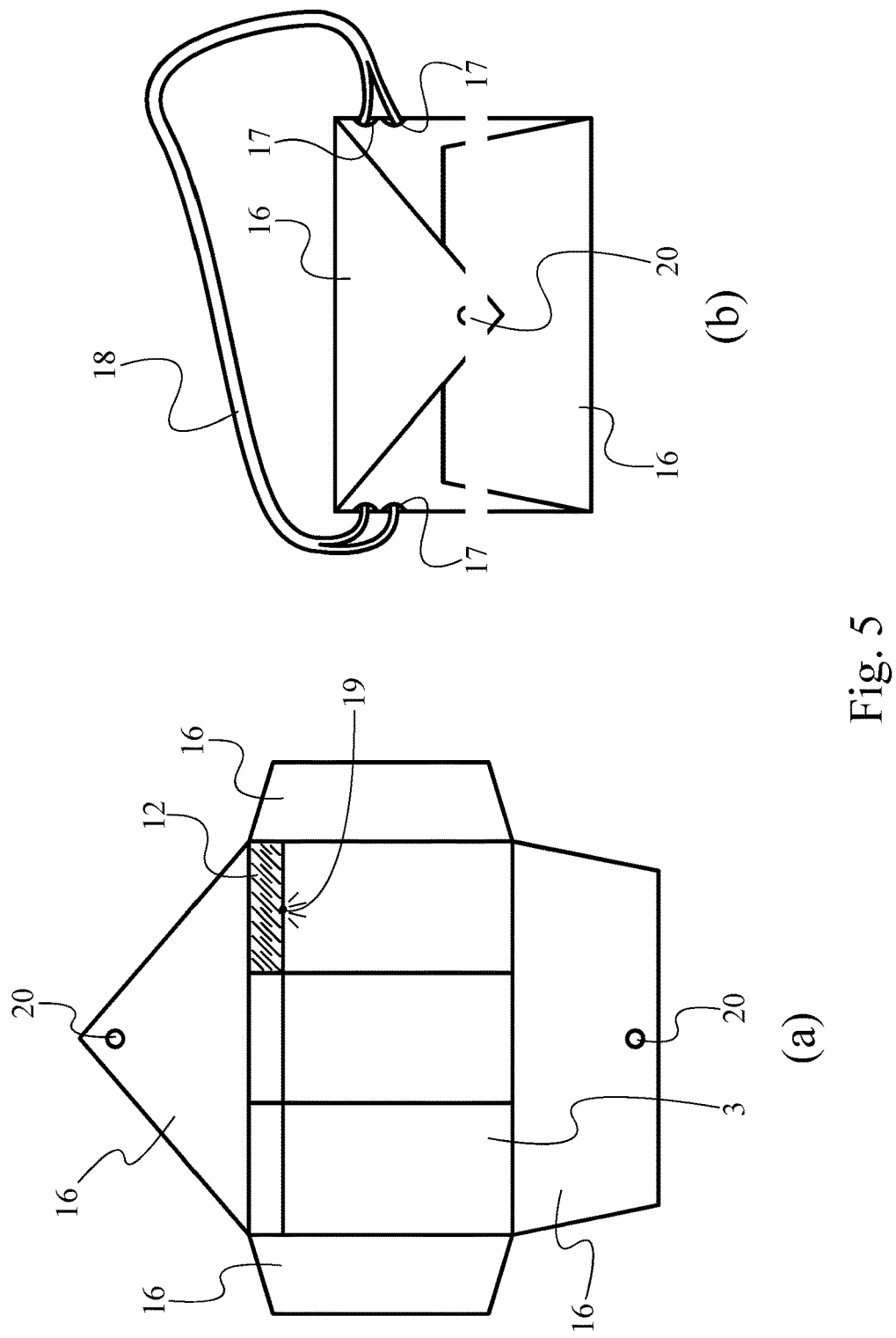
FIG. 5 shows a plan view of a particular embodiment of the invention in which the kit 1 is shaped in a manner such to be easily transportable by its user. For such purpose, the kit 1 has a plurality of lateral projections 16 which, when suitably combined and fixed on each other, form a bag. More in detail, the kit 1 comprises, in this embodiment, at least two lateral projections 16 of the plurality of lateral projections 16 having the components of a common opening/closing system, such as the components of a common automatic button or Velcro 20. The kit 1, in this embodiment, is further provided with at least two lateral projections of the plurality of lateral projections having at least two slots or holes 17 adapted to hook a common belt 18.

A kit 1 for the heat treatment of foods, subject of the present industrial invention patent application, in its preferred embodiment comprises a first portion 1' and a second portion 1". The first portion 1' used for heating one or more dishes, and the second portion 1" used for cooling foods and in particular for cooling drinks. All of the heating/cooling is due to thermal variations, induced by chemical transformations of specific substances. The first and second portions 1' and 1" can be further separated due to a common connection 14 with tear-off serration or by means of a coupling mechanism involving the edges of the first and second portions (1') and (1"). More in detail, the first portion 1' of the kit 1 comprises, a plate 2 having at least one compartment 3 used for containing a given dish, and a vat 4 lying below said plate 2. More in detail the plate 2 is inserted within the vat 4 in a manner such to form an interspace 5 therewith, adapted to contain the chemical reagents responsible for raising the temperature. The plate 2 and the underlying vat 4 are also welded to each other by means of ultrasound technique. Still more in detail, the interspace 5 receives a pre-established amount of $CaCl_2$, in scale form, scattered on the bottom of the interspace 5, and a predefined amount of liquid water, contained in at least one coil-shaped phial 6. The breakage of the at least one phial 6 causes the dispersion of the water on the bottom of the interspace 5 and the reaction of the water with $CaCl_2$, facilitating the raising of the temperature of the dish contained in the plate 2 up to a value of about 70° C. The breakage of the at least one phial 6 occurs due to the presence of at least one pin 7 present on the inner surface of the vat 4, adjacent to the at least one phial 6. The user, by exerting slight pressure on the external surface portion of the vat 4, at the at least one pin 7, will cause the breakage of the at least one phial 6, giving rise to the heating of the meal. The second portion 1", adapted to cool the drink, instead comprises at least one compartment 8, variously shaped, adapted to receive a container 9 used for containing a predetermined amount of pellets or cylinders of $CO_{2(s)}$. The amount of $CO_{2(s)}$ introduced is comprised between 0.5 g and 50 g and is preferably equal to 10 g. More in detail the container 9, it too variously shaped in a manner such that its profile corresponds with that of the at least one compartment 8. The container 9 is made of polystyrene and has an internal cavity 10 adapted to receive the $CO_{2(s)}$. More in detail, the profile of the container 9, analogous to that of the at least one compartment 8 in which the container 9 is inserted, is defined by any closed curve or polygonal form, while that of the cavity 10 is preferably circular. In addition, the thickness of the container 9 is at least 1.5 cm as to prevent the rapid dispersion and sublimation of the $CO_{2(s)}$. For the same purpose, the container 9 is provided with a cover 11 adapted to isolate the $CO_{2(s)}$, present in the cavity 10, from the outside environment. The cover 11 is to be removed only when the user of the kit intends to cool his drink. The cooling in question will therefore occur by inserting the bottom of the glass, or the small bottle containing the drink, inside the cavity 10 in a manner such that said bottom is in contact with the $CO_{2(s)}$. In one of the embodiments of the invention, the kit 1 comprises the at least one phial 6, shaped as a coil, internally divided into sectors 6', each containing a specific amount of water. Each sector 6' is insulated, from the adjacent sector, due to a wall 15, which is transverse with respect to the at least one phial 6. The wall 15 is made of the same material as the coil, e.g. made of glass or plexiglass. This embodiment offers the user of the kit 1 the possibility to heat the dishes contained in the at least one compartment 3 of the plate 2 at different times, inducing a gradual release of water. This advantage is, more in detail, offered by the possibility to selectively break each sector 6' by suitably acting on the at least one pin 7 that is situated at the sector 6' which one intends to break.

In a particular embodiment of the present invention, the kit 1 for the heat treatment of foods is characterized by its particular profile. More in detail, the kit is shaped in a manner so as to be a bag easily transportable by its user. Still more in detail, the kit 1 has its portions, used for containing foods, with lateral projections 16 which, when suitably combined with each other, form a suitcase or bag that is easily transportable. The kit 1, in this particular embodiment, has at least two lateral projections 16 of a plurality of lateral projections 16 having at least two slots or holes 17 adapted to hook a common belt 18, preferably made of the same material as the first and/or second portions 1,' 1." A common automatic button or Velcro 20 is provided on at least two of the lateral projections 16 of the plurality of lateral projections 16. In its many different embodiments, the present kit 1 differs from the versions described above due to the possibility to contain compartments 12 used for containing objects such as: serviettes, a thermometer and/or a condiment and/or toothpicks, and wherein one compartment of said compartments 12 has the bottom covered by a mirrored material 13. Said objects are particularly useful for carrying out operations such as: monitoring the temperature variation induced by the exothermic chemical reaction, thus selecting the temperature at which one prefers to eat the dish; seasoning/dressing the food and having instruments available that can be useful at the end of the meal. In a further embodiment of the present invention, another compartment 12 of said compartments 12—used for containing foods such as oil and/or salt and/or vinegar and/or salsas and/or spices with various flavor—is provided with a small atomizing hole 19 adapted to season/dress the food with a spray mechanism, in a manner so as to make the dispersion of the condiment in the dish more uniform. This embodiment is particularly useful when the plate 2 contains salad. In this case the kit 1 will comprise the another compartment 12 containing the condiment, which can be dispensed by exerting slight pressure on any of the surfaces of the another compartment 12, which will of course be closed.

In all embodiments thereof, the kit 1, subject of the present industrial invention patent application, comprises at least two separate films made of Bi-Oriented Polypropylene (BOPP), adapted to seal the first and second portions 1' and 1". More in detail, at least one film seals the first portion 1' and at least another film seals the second portion 1" when present.

What is claimed is:

1. A kit for heat treating foods, the kit comprising:
    a first portion including:
        at least one plate having at least one first compartment and at least one second compartment, the at least one first compartment is adapted to contain a given dish, the at least one second compartment is adapted to contain at least one of serviettes, thermometer, and toothpicks;
        at least one vat attached to the at least one plate to form an interspace containing $CaCl_2$ scales;
        at least one coil-shaped phial disposed in the interspace and containing deionized water;
        at least one wall arranged transversely to the at least one coil-shaped phial to divide the at least one coil-shaped phial into at least two sectors; and
        at least one pin extending from the at least one vat and arranged adjacently to the at least one coil-shaped phial, the at least one pin configured to break the at least one coil-shaped phial.

2. The kit of claim 1, further comprising a second portion that is adapted to cool foods and joined to the first portion by one of a connection having tear-off serration and a coupling mechanism involving edges of the first and second portions.

3. The kit of claim 2, wherein the second portion includes at least one compartment that receives a container made of polystyrene, and wherein the container contains solid $CO_2$.

4. The kit of claim 3, wherein a cover made of polystyrene covers a cavity formed in the container, and wherein the solid $CO_2$ is disposed in the cavity.

5. The kit of claim 4, wherein the container has a thickness of at least 1.5 cm.

6. The kit of claim 5, wherein the solid $CO_2$ disposed in the cavity is between 0.5 g and 50 g.

7. The kit of claim 6, wherein the at least one compartment of the second portion and the container have a profile defined by any closed curve or polygonal form.

8. The kit of claim 7, wherein the cavity defined by the container and the cover has a circular profile.

9. The kit of claim 8, wherein the at least one second compartment of the at least one plate has a bottom covered by mirrored material.

10. The kit of claim 9, wherein the at least one second compartment of the at least one plate is provided with an atomizing hole that permits a spray mechanism to provide uniform dispersion of a condiment within the at least one second compartment.

11. The kit of claim 10, wherein the first portion is sealed by a film made of Bi-Oriented Polypropylene, and wherein the second portion is sealed by a film made of Bi-Oriented Polypropylene.

12. The kit of claim 1, further comprising a plurality of lateral projections that cooperate with each other and the first portion to form a bag that is transportable.

13. The kit of claim 12, wherein at least two lateral projections of the plurality of lateral projections are provided with one of a button and Velcro.

14. The kit of claim 13, wherein at least two lateral projections of the plurality of lateral projections are provided with at least two slots that receive a belt.

15. The kit of claim 1, used for catering services.

* * * * *